US008920952B2

(12) United States Patent
Bae et al.

(10) Patent No.: US 8,920,952 B2
(45) Date of Patent: Dec. 30, 2014

(54) BATTERY PACK ASSEMBLY

(75) Inventors: Joon-Soo Bae, Yongin-si (KR);
Min-Cheol Bae, Yongin-si (KR); Ik-Jae Jeong, Yongin-si (KR); Tae-Jin Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 129 days.

(21) Appl. No.: 13/344,568

(22) Filed: Jan. 5, 2012

(65) Prior Publication Data

US 2013/0017422 A1  Jan. 17, 2013

(30) Foreign Application Priority Data

Jul. 12, 2011 (KR) .................. 10-2011-0068965

(51) Int. Cl.
| | |
|---|---|
| *H01M 2/12* | (2006.01) |
| *H01M 10/16* | (2006.01) |
| *H01M 2/10* | (2006.01) |
| *H01M 10/625* | (2014.01) |
| *H01M 10/658* | (2014.01) |
| *H01M 10/613* | (2014.01) |
| *H01M 10/615* | (2014.01) |
| *H01M 10/647* | (2014.01) |
| *H01M 10/6563* | (2014.01) |

(52) U.S. Cl.
CPC .............. *H01M 2/1077* (2013.01); *H01M 2/12* (2013.01); *H01M 2/1094* (2013.01); *H01M 10/5004* (2013.01); *H01M 10/5006* (2013.01); *H01M 10/5016* (2013.01); *H01M 10/5032* (2013.01); *H01M 10/5067* (2013.01); *H01M 10/5087* (2013.01); *H01M 2220/20* (2013.01)
USPC ................. 429/83; 429/208; 429/82

(58) Field of Classification Search
CPC ... H01M 2/12; H01M 2/1094; H01M 2/1077; H01M 10/5087; H01M 10/5004; H01M 10/5067

USPC .............................................. 429/82, 83, 208
See application file for complete search history.

(56) References Cited

U.S. PATENT DOCUMENTS

| | | | |
|---|---|---|---|
| 2006/0068278 A1 | 3/2006 | Bloom et al. | |
| 2008/0264291 A1 | 10/2008 | Pike et al. | |
| 2009/0111010 A1* | 4/2009 | Okada et al. | .................. 429/120 |

FOREIGN PATENT DOCUMENTS

| | | |
|---|---|---|
| JP | 05-275115 | 10/1993 |
| JP | 2006216471 A  * | 8/2006 |

(Continued)

OTHER PUBLICATIONS

Machine Translation of KR 1020110003912 A.*
Machine Translation of JP 2006-216471 A.*
Patent Abstracts of Japan and English Translation of JP 05-275115 (9 sheets).
Patent Abstracts of Japan and English Translation of JP 2010-086784 (15 sheets).

(Continued)

*Primary Examiner* — Jonathan Jelsma
(74) *Attorney, Agent, or Firm* — Christie, Parker & Hale, LLP

(57) ABSTRACT

A battery pack assembly including: an inner pack accommodating a plurality of secondary cells; an outer pack accommodating the inner pack; a first shock absorbing member between a first surface of the inner pack and a first surface of the outer pack, the first shock absorbing member configured to absorb a shock between the inner pack and the outer pack; and a second shock absorbing member between at least a side surface of the inner pack and a side surface of the outer pack among surfaces of the inner pack and the outer pack other than the first surfaces, the second shock absorbing member configured to absorb a shock between the inner pack and the outer pack.

13 Claims, 4 Drawing Sheets

(56) References Cited

FOREIGN PATENT DOCUMENTS

| JP | 2007-273180 | 10/2007 |
| JP | 2010-086784 | 4/2010 |
| JP | 2010-097872 | 4/2010 |
| KR | 10-1998-026947 | 7/1998 |
| KR | 10-2001-0036651 | 5/2001 |
| KR | 2003-0066764 | 8/2003 |
| KR | 10-2011-0003912 | 1/2011 |
| WO | WO 98/31059 A1 | 7/1998 |

OTHER PUBLICATIONS

Patent Abstracts of Japan and English Translation of JP 2010-097872 (31 sheets).
English Translation of Korean Publication No. 10-1998-026947, previously submitted in an IDS dated Jan. 5, 2012 (6 sheets).
KIPO Office action dated Nov. 29, 2012, for Korean priority Patent application 10-2011-0068965, (7 pages).
Patent Abstracts of Japan, and English machine translation of Japanese Publication 2007-273180, (18 pages).

* cited by examiner

BATTERY PACK ASSEMBLY

CROSS-REFERENCE TO RELATED APPLICATION

This application claims priority to and the benefit of Korean Patent Application No. 10-2011-0068965, filed on Jul. 12, 2011 in the Korean Intellectual Property Office, the entire content of which is incorporated herein by reference.

BACKGROUND

1. Field

Aspects of embodiments of the present invention relate to a battery pack assembly.

2. Description of the Related Art

As issues such as carbon emission rights or rights on environmental burden are raised, a variety of research into new regenerable energy for power or regenerable energy has been conducted. As a part of the research, research into secondary cells for use in vehicles has been continued. Such research is applicable to automobile and railroad fields, for example.

A power storage device including a plurality of secondary cells connected in serial and/or in parallel may be used in an electric or hybrid electric vehicle, such as an automobile or locomotive. Thus, there is a need to control external factors such as a temperature, a vibration, or a shock of a power storage device.

SUMMARY

According to an aspect of one or more embodiments of the present invention, a battery pack assembly is configured to protect secondary cells from an external vibration or shock.

Additional aspects of embodiments of the present invention are set forth, in part, in the description which follows and, in part, will be apparent from the description, or may be learned by practice of the presented embodiments.

According to an embodiment of the present invention, a battery pack assembly includes: an inner pack accommodating a plurality of secondary cells; an outer pack accommodating the inner pack; a first shock absorbing member between a first surface of the inner pack and a first surface of the outer pack, the first shock absorbing member configured to absorb a shock between the inner pack and the outer pack; and a second shock absorbing member between at least a side surface of the inner pack and a side surface of the outer pack among surfaces of the inner pack and the outer pack other than the first surfaces, the second shock absorbing member configured to absorb a shock between the inner pack and the outer pack.

The first shock absorbing member may include a spring.

The second shock absorbing member may contact the side surface of the inner pack and the side surface of the outer pack.

The second shock absorbing member may include an elastic and thermally insulative material.

The inner pack and the outer pack may have substantially hexahedral shapes, and the second shock absorbing member may include: a first shock absorption unit between the side surface of the inner pack and the side surface of the outer pack; and a second shock absorption unit between a second surface of the inner pack and a second surface of the outer pack, the second surfaces of the inner and outer packs being opposite the first surfaces.

The first shock absorption unit may be fixed to the side surface of the outer pack.

The battery pack assembly may further include a third shock absorbing member between a second surface of the inner pack and a second surface of the outer pack, the second surfaces of the inner and outer packs being opposite the first surfaces.

The third shock absorbing member may include a spring. The second shock absorbing member may include an elastic and thermally insulative material. The second shock absorbing member may include: a first shock absorption unit between the side surface of the inner pack and the side surface of the outer pack; and a second shock absorption unit between the second surface of the inner pack and the second surface of the outer pack.

The battery pack assembly may further include a plurality of flow channels between neighboring secondary cells of the plurality of secondary cells and through which a gas for controlling temperatures of the plurality of secondary cells flows.

The inner pack may include an inlet and an outlet through which a gas flowing in the inner pack enters and exits the inner pack to control temperatures of the plurality of secondary cells.

The inlet may be formed in a bottom portion of the inner pack.

The battery pack assembly may further include a cooling unit to supply a cooling gas to the inner pack.

The battery pack assembly may further include a heating unit to supply a heating gas to the inner pack.

The battery pack assembly may be configured for use as a power source for propelling an electric vehicle or a hybrid electric vehicle.

BRIEF DESCRIPTION OF THE DRAWINGS

The above and/or other aspects of embodiments of the present invention will become more readily apparent and appreciated from the following description of some exemplary embodiments thereof, taken in conjunction with the accompanying drawings, of which.

DETAILED DESCRIPTION

Some exemplary embodiments of the present invention are described more fully hereinafter with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art. As those skilled in the art would realize, the described embodiments may be modified in various ways, all without departing from the spirit or scope of the present invention. Further, the terminology used herein may be for the purpose of describing particular embodiments only and is not intended to be limiting of the invention. Also, as used herein, the singular forms "a," "an," and "the" are intended to include the plural forms as well, unless the context clearly indicates otherwise. It will be further understood that the terms "comprises" and/or "comprising," when used in this disclosure, specify the presence of stated features, integers, steps, operations, elements, and/or components, but do not preclude the presence or addition of one or more other features, integers, steps, operations, elements, components, and/or groups thereof. It will be understood that although the terms first and second may be used herein to describe various elements, these elements should not be limited by these terms. These terms are only used to distinguish one element from another element. Thus, a first element discussed below could be termed a second element, and similarly, a second element may be termed a first element without departing from the teachings of this disclosure.

Figure 1:
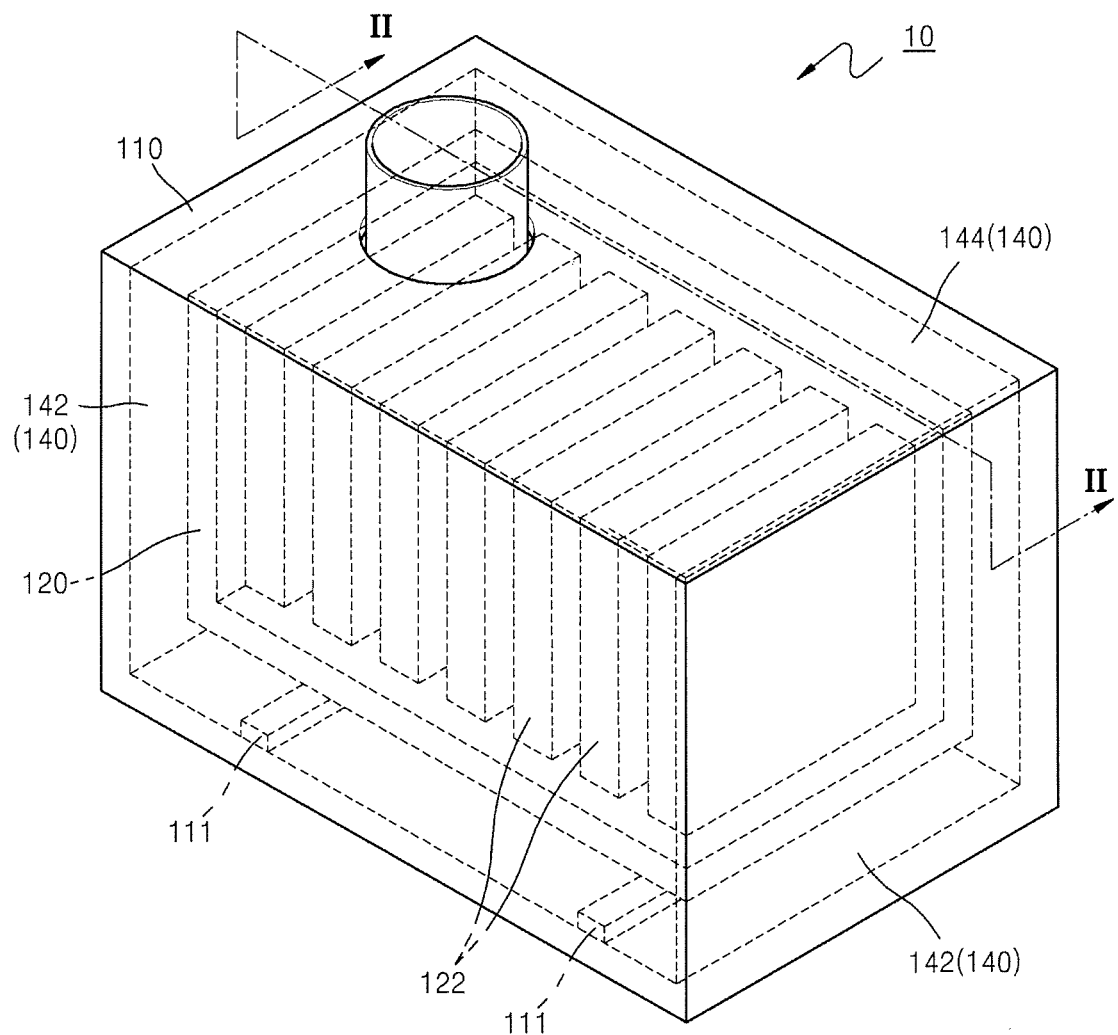
FIG. 1 is a perspective view of a battery pack assembly according to an embodiment of the present invention.
Figure 2:
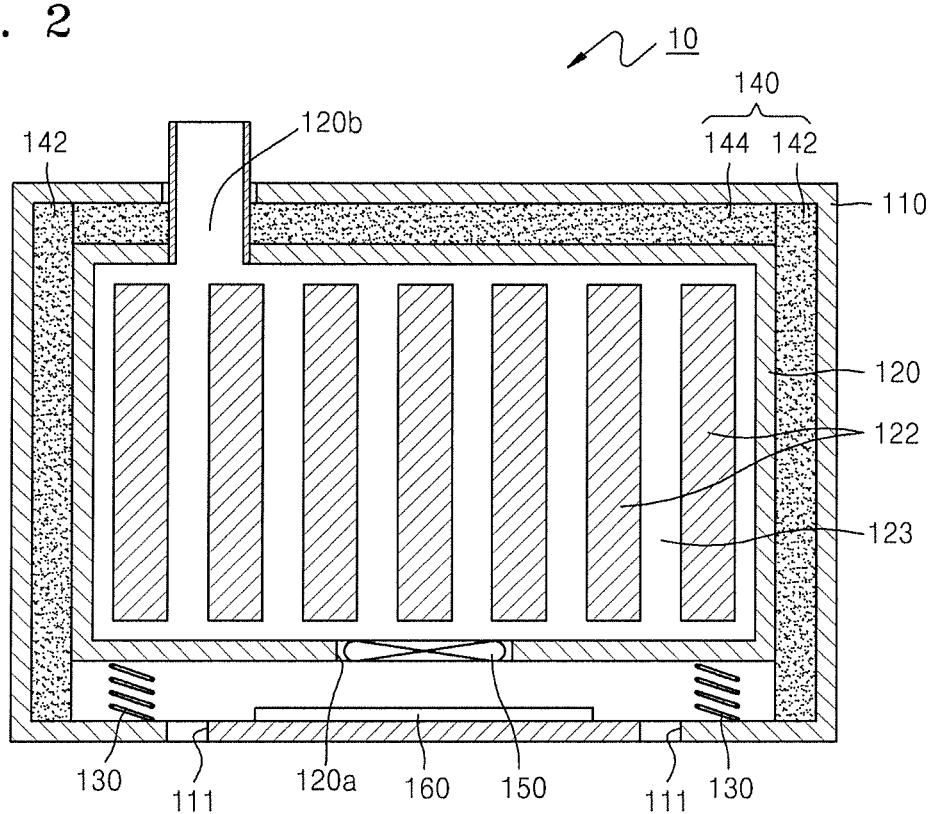
FIG. 2 is a cross-sectional view of the battery pack assembly of FIG. 1, taken along the line II-II.

FIG. 1 is a perspective view of a battery pack assembly 10 according to an embodiment of the present invention. FIG. 2 is a cross-sectional view of the battery pack assembly 10 taken along the line II-II of FIG. 1.

Referring to FIGS. 1 and 2, according to an embodiment of the present invention, the battery pack assembly 10 includes an outer pack 110, an inner pack 120, and first and second shock absorbing members 130 and 140 disposed between the inner pack 120 and the outer pack 110.

The outer pack 110, in one embodiment, has a generally hexahedral shape, and accommodates the inner pack 120 and the first and second shock absorbing members 130 and 140. The outer pack 110 may further include a cooling unit 150 and/or a heating unit 160 for controlling and/or maintaining appropriate temperatures of a plurality of secondary cells 122.

The inner pack 120, in one embodiment, has a generally hexahedral shape and accommodates the secondary cells 122. The secondary cells 122, in one embodiment, are spaced apart from each other in one direction, and spaces between the secondary cells 122 define flow channels 123 in which a cooling fluid or a heating fluid that flows through the inner pack 120 moves. The secondary cells 122 may be lithium ion cells, for example. However, the secondary cells 122 are not limited thereto and may be any other suitable chargeable and dischargeable secondary cells. For example, nickel-cadmium cells or lead-acid cells may be used as the secondary cells 122. The secondary cells 122 may be manufactured in various ways and as various types, such as angular or pouch-type secondary cells, but are not limited thereto.

The battery pack assembly 10 according to an embodiment of the present invention may be used in regenerative braking in transportation means such as locomotives, automobiles, etc. While the transportation means moves or temporarily stops, the battery pack assembly 10 may be shocked by vibration or shock from an external object, e.g., another automobile. The first and second shock absorbing members 130 and 140 protect the secondary cells 122 from vibration or shock applied to the battery pack assembly 10.

The first shock absorbing member 130 is disposed between an outer bottom surface of the inner pack 120 and an inner bottom surface of the outer pack 110, and absorbs a vibration or shock between the inner pack 120 and the outer pack 110. In one embodiment, the first shock absorbing member 130 may include an elastic body, such as a spring. If the vibration or shock is applied to the battery pack assembly 10, the spring may be compressed or stretched to absorb the vibration or shock applied to the battery pack assembly 10 in a vertical direction. In one embodiment, the first shock absorbing member 130 may include a plurality of springs that may be spaced apart from each other (e.g., spaced apart by a predetermined distance).

The second shock absorbing member 140, in one embodiment, is disposed between the inner pack 120 and the outer pack 110 at regions other than the bottom surface of the inner pack 120 and the bottom surface of the outer pack 110, and absorbs the vibration or shock between the inner pack 120 and the outer pack 110. The second shock absorbing member 140 may contact surfaces of the inner pack 120 and the outer pack 110.

The second shock absorbing member 140, in one embodiment, may include a side surface shock absorption unit 142 disposed between an outer side surface of the inner pack 120 and an inner side surface of the outer pack 110, and a top surface shock absorption unit 144 disposed between an outer top surface of the inner pack 120 and an inner top surface of the outer pack 110.

One surface of the side surface shock absorption unit 142 contacts the side surface of the inner pack 120 and another surface of the side surface shock absorption unit 142 contacts the side surface of the outer pack 110. In one embodiment, the inner pack 120 and the outer pack 110 have generally hexahedral shapes, and the side surface shock absorption unit 142 may be included at four side surfaces between the inner pack 120 and the outer pack 110. In one embodiment, one surface of the side surface shock absorption unit 142 (i.e. a surface contacting the inner side surface of the outer pack 110) may be fixed to the outer pack 110 by using an adhesive material. In one embodiment, because one surface of the side surface shock absorption unit 142 is fixed to the inner side surface of the outer pack 110 and another surface of the side surface shock absorption unit 142 contacts the outer side surface of the inner pack 120, the side surface shock absorption unit 142 may be prevented or substantially prevented from moving from a corresponding location even though the inner pack 120 may vibrate up and down due to the first shock absorbing member 130, which may be the above-described spring.

One surface of the top surface shock absorption unit 144 contacts the outer top surface of the inner pack 120 and another surface of the top surface shock absorption unit 144 contacts the inner top surface of the outer pack 110. The top surface shock absorption unit 144 may be adhered to the top surface of the inner pack 120 or the top surface of the outer pack 110 by using an adhesive material.

The side surface shock absorption unit 142 and the top surface shock absorption unit 144 may include an elastic material, such as silicon or rubber, in order to absorb a vibration or shock applied to the battery pack assembly 10. If the vibration or shock is applied to the battery pack assembly 10, the side surface shock absorption unit 142 may absorb the vibration or shock applied to the battery pack assembly 10 in a horizontal direction, and the top surface shock absorption unit 144, along with the first shock absorbing member 130 (e.g., a spring), may absorb the vibration or shock applied to the battery pack assembly 10 in a vertical direction.

The side surface shock absorption unit 142 and the top surface shock absorption unit 144 may include a thermal insulation material, such as silicon, polymer synthetic resin. That is, in one embodiment, the side surface shock absorption unit 142 and the top surface shock absorption unit 144 exhibit thermal insulation properties, and the influence of external temperature on the secondary cells 122 may be minimized or reduced. For example, although the battery pack assembly 10 may be exposed to an environment of an extremely low or high temperature, according to an embodiment of the present invention, it takes a long time to achieve thermal equilibrium of the secondary cells 122 with the external temperature due to the side surface shock absorption unit 142 and the top surface shock absorption unit 144 having thermal insulation properties, and damage or deterioration of the secondary cells 122 due to the external temperature may be prevented or reduced.

In one embodiment, the cooling unit 150 may be accommodated in the outer pack 110, and may supply a cooling medium (e.g., cooling air) to the secondary cells 122. For example, in one embodiment, the cooling unit 150 may include a cooling fan. If a temperature of the inner pack 120 increases due to heat generated by operations of the secondary cells 122, the cooling unit 150 may operate and cool the secondary cells 122.

The inner pack 120 may include an inlet 120*a* through which the cooling medium moving toward the secondary cells 122 enters or is injected into the inner pack 120 and an outlet 120*b* through which the cooling medium exits or is ejected from the inner pack 120 while moving away from the secondary cells 122. For example, in one embodiment, the inlet 120*a* may be formed in a bottom surface of the inner pack 120, and the outlet 120*b* may be formed in a top surface of the inner pack 120. However, although, in one embodiment, the inlet 120*a* is formed in the bottom surface of the inner pack 120, and the outlet 120*b* is formed in the top surface of the inner pack 120, the present invention is not limited thereto.

The cooling unit 150 may be disposed between a bottom surface of the inner pack 120 and a bottom surface of the outer pack 110. The cooling medium moved or injected into the inner pack 120 by using the cooling unit 150 passes through the flow channels 123 between the secondary cells 122, removes heat from the secondary cells 122, and exits from the inner pack 120 to the outside through the outlet 120*b*. In one embodiment, the inlet 120*a* is formed in the bottom surface of the inner pack 120, and the outlet 120*b* is formed in the top surface thereof, and the cooling medium (e.g., cooling air) having an increased temperature due to the removed heat of the secondary cells 122 may be light and easily exit from the inner pack 120 through the outlet 120*b*.

In one embodiment, air flow holes 111 are formed in the outer pack 110 such that an inner space and an outer space of the outer pack 110 are in fluidic communication with each other. In one embodiment, cooling air is injected through the air flow holes 111 such that the cooling unit 150 may continuously supply the cooling air to the secondary cells 122. In one embodiment, the air flow holes 111 formed in the outer pack 110 may have small or minimal areas such that the inner pack 120 is prevented or substantially prevented from being directly influenced by an exposed external environment.

The cooling unit 150 may operate when the battery pack assembly 10 is exposed to an extremely high temperature, as well as when heat is generated by the secondary cells 122. The cooling unit 150, along with the second shock absorbing member 140 including the thermal insulation material, may effectively manage the temperature of the secondary cells 122.

The heating unit 160, in one embodiment, is included in the outer pack 110, and may supply a heating gas (e.g., heating air) to the secondary cells 122. For example, the heating unit 160 may include a heater. If the battery pack assembly 10 is exposed to an environment of an extremely low temperature, the heating unit 160 may operate. In one embodiment, air inside the battery pack assembly 10 is heated by an operation of the heating unit 160, and the heating air moves toward the secondary cells 122 though the inlet 120*a* of the inner pack 120 and maintains temperatures of the secondary cells 122.

The heating unit 160, in one embodiment, may be disposed between the bottom surface of the inner pack 120 and the bottom surface of the outer pack 110. The air heated by the heating unit 160 may be supplied to the secondary cells 122 through the inlet 120*a* formed in the inner pack 120 according to a convection current phenomenon. Like the cooling unit 150, the heating unit 160, along with the second shock absorbing member 140 including the thermal insulation material, may efficiently manage the temperatures of the secondary cells 122.

Figure 3:
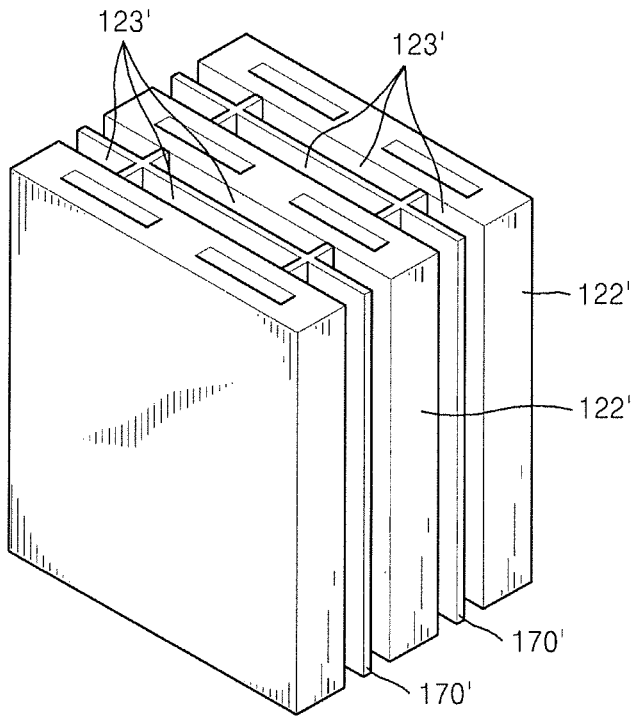
FIG. 3 is a perspective view of secondary cells and channel portioning units of a battery pack assembly according to an embodiment of the present invention.

FIG. 3 is a perspective view of secondary cells 122' and channel portioning units 170' of a battery pack assembly (e.g., the battery pack assembly 10) according to an embodiment of the present invention.

Spaces between the neighboring secondary cells 122 in the battery pack assembly 10 described above with reference to FIGS. 1 and 2 respectively act as flow channels 123 (e.g., single flow channels) through which a cooling gas or a heating gas travels, whereas spaces between the neighboring secondary cells 122' of the embodiment shown in FIG. 3 are respectively divided by the channel portioning units 170' into a plurality of flow channels 123'.

Referring to FIG. 3, the channel portioning units 170' are disposed between the neighboring secondary cells 122' such that the spaces between the secondary cells 122' may respectively be divided into a plurality of flow channels 123'. A flow rate and a direction of a cooling gas or a heating gas may remain constant due to the flow channels 123', and cooling and/or heating efficiency of the secondary cells 122' may be increased.

Figure 4:
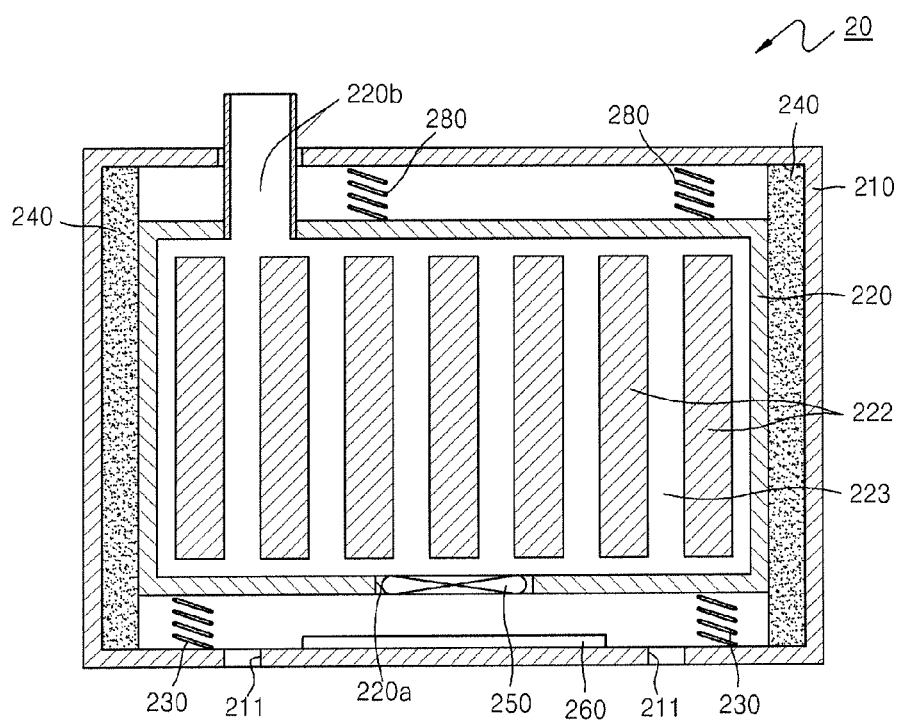
FIG. 4 is a cross-sectional view of a battery pack assembly according to another embodiment of the present invention.

FIG. 4 is a cross-sectional view illustrating a battery pack assembly 20 according to another embodiment of the present invention.

Referring to FIG. 4, according to one embodiment, the battery pack assembly 20, includes an outer pack 210, an inner pack 220, first and second shock absorbing members 230 and 240 disposed between the outer pack 210 and the inner pack 220, a cooling unit 250, and a heating unit 260. The structures of the inner pack 220 and the outer pack 210, in that the inner pack 220 accommodates secondary cells 222 spaced apart from each other (e.g., spaced apart by a predetermined gap) in a direction to define flow channels 223 therebetween, and includes an inlet 220*a* and an outlet 220*b*, and the outer pack 210 includes one or more air flow holes 211, and the structures of the cooling unit 250 and the heating unit 260, may be the same as those described above with reference to FIGS. 1 and 2.

The battery pack assembly 20 of FIG. 4 differs from the battery pack assembly 10 in terms of locations and structures of the second shock absorbing member 240.

The first shock absorbing member 230 is disposed between a bottom surface of the inner pack 220 and a bottom surface of the outer pack 210, and absorbs a vibration or shock generated between the inner pack 220 and the outer pack 210. For example, the first shock absorbing member 230 may be a spring that is compressed or stretched to absorb vibration or shock applied to the battery pack assembly 20 in a vertical direction.

The second shock absorbing member 240 is disposed between a side surface of the inner pack 220 and a side surface of the outer pack 210, and absorbs a vibration or shock generated between the inner pack 220 and the outer pack 210. The second shock absorbing member 240 may contact surfaces of the inner pack 220 and the outer pack 210. In one embodiment, one surface of the second shock absorbing member 240 contacts the outer side surface of the inner pack 220, and another surface of the second shock absorbing member 240 contacts the inner side surface of the outer pack 210. In one embodiment, the inner pack 220 and the outer pack 210 have generally hexahedral shapes, and the second shock absorbing member 240 may be included in four side surfaces between the inner pack 220 and the outer pack 210.

The second shock absorbing member 240, in one embodiment, may include elastic and thermal insulation materials as described above with respect to the second shock absorbing member 140 of the battery pack assembly 10. One surface of a side surface shock absorption unit 240, in one embodiment, is also fixed to the inner side surface of the outer pack 210 such that the side surface shock absorption unit 240 may be prevented or substantially prevented from being moved from its location while the inner pack 220 moves up and down due to the first shock absorbing member 230.

The battery pack assembly, in one embodiment, further includes a third shock absorbing member 280 (e.g., one or more springs), which may be disposed between the top surface of the inner pack 220 and the top surface of the outer pack 210. The third shock absorbing member 280 may absorb a vibration or shock generated in a vertical direction, such as by the first shock absorbing member 230 (e.g., one or more springs).

Figure 5:
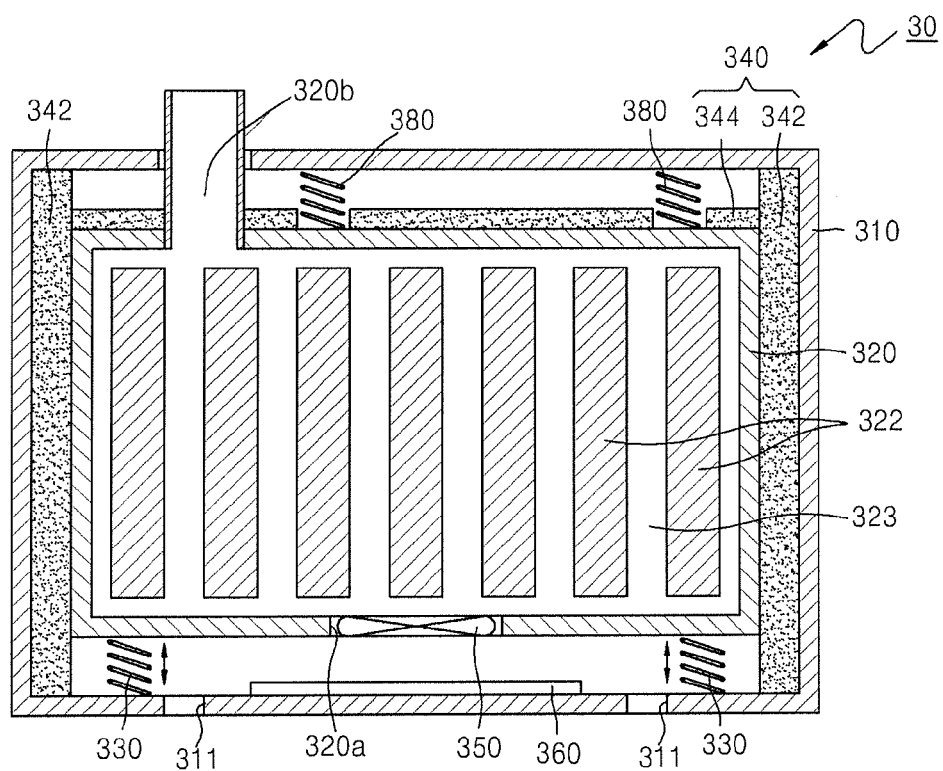
FIG. 5 is a cross-sectional view of a battery pack assembly according to another embodiment of the present invention.

FIG. 5 is a cross-sectional view illustrating a battery pack assembly 30 according to another embodiment of the present invention.

Referring to FIG. 5, according to one embodiment, the battery pack assembly 30 includes an outer pack 310, an inner pack 320, first and second shock absorbing members 330 and 340 disposed between the outer pack 310 and the inner pack 320, a cooling unit 350, and a heating unit 360. The structures of the inner pack 320 and the outer pack 310, in that the inner pack 320 accommodates secondary cells 322 spaced apart from each other (e.g., spaced apart by a predetermined gap) in a direction to define flow channels 323 therebetween, and includes an inlet 320a and an outlet 320b, and the outer pack 310 includes one or more air flow holes 311, and the structures of the cooling unit 350 and the heating unit 360, may be the same as those described above with reference to FIGS. 1 and 2 or FIG. 4.

The battery pack assembly 30 of FIG. 5 differs from the battery pack assemblies 10 or 20 in terms of locations and structures of the second shock absorbing members 340.

The first shock absorbing member 330, in one embodiment, is disposed between a bottom surface of the inner pack 320 and a bottom surface of the outer pack 310, and absorbs a vibration or shock generated between the inner pack 320 and the outer pack 310. For example, the first shock absorbing member 330 may be a spring that is compressed or stretched to absorb vibration or shock applied to the battery pack assembly 30 in a vertical direction.

The second shock absorbing members 340 are disposed between a side surface of the inner pack 320 and a side surface of the outer pack 310 and between a top surface of the inner pack 320 and a top surface of the outer pack 310, and absorb a vibration or shock generated between the inner pack 320 and the outer pack 310. The second shock absorbing member 340 may contact surfaces of the inner pack 320 and the outer pack 310. In one embodiment, the second shock absorbing members 340 may include a side surface absorption unit 342 disposed between the outer side surface of the inner pack 320 and the inner side surface of the outer pack 310, and a top surface shock absorption unit 344 disposed between the top surface of the inner pack 320 and the top surface of the outer pack 310.

In one embodiment, the side surface absorption unit 342 and the top surface shock absorption unit 344 may include elastic and thermal insulation materials, and maintain a constant temperature of the inner pack 320. In one embodiment, one surface of the side surface absorption unit 342 is also fixed to the inner side surface of the outer pack 310 such that the side surface absorption unit 342 may be prevented or substantially prevented from being moved from its location while the inner pack 320 moves up and down due to the first shock absorbing member 330.

The battery pack assembly 30, in one embodiment, further includes a third shock absorbing member 380 disposed between the top surface of the inner pack 320 and the top surface of the outer pack 310 which may absorb, along with the first shock absorbing member 330, a vibration or shock applied to the battery pack assembly 30. One or more springs may be used as the third shock absorbing member 380, like the first shock absorbing member 330. The springs may be included in the top and bottom portions of the inner pack 320, and a top surface shock absorption unit 344 may also be included in the top surface of the inner pack 320, thereby more effectively controlling the vibration or shock applied to the battery pack assembly 30 in a vertical direction and/or thermal insulation of the secondary cells 322.

As described above, the battery pack assemblies 10, 20, and 30 may be used in various transportation means, such as automobiles, locomotives, ships, etc. The battery pack assemblies 10, 20, and 30 include the first and second shock absorbing members 130, 230, 330, 140, 240, and 340, and in the battery pack assemblies 20 and 30, the third shock absorbing members 280 and 380, thereby effectively protecting the secondary cells 122, 222, and 322 even though vibration or shock may be applied to the battery pack assemblies 10, 20, and 30 in a vertical and/or horizontal direction. The battery pack assemblies 10, 20, and 30 may further include the cooling unit 150, 250, and 350, and/or the heating unit 160, 260, and 360 for maintaining an appropriate temperature range necessary for operations of the secondary cells 122, 222, and 322 even though heat may be generated from the secondary cells 122, 222, and 322 and/or the battery pack assemblies 10, 20, and 30 may be exposed to an environment of an extremely low temperature and/or an extremely high temperature.

According to embodiments of the present invention, secondary cells accommodated in a battery pack assembly are protected from an external vibration or shock.

Further, according to embodiments of the present invention, a cooling gas or a heating gas may be supplied to secondary cells accommodated in a battery pack, thereby maintaining a temperature range necessary for operations of the secondary cells.

While the present invention has been particularly shown and described with reference to some exemplary embodiments thereof, it will be understood by those of ordinary skill in the art that various changes in form and details may be made therein without departing from the spirit and scope of the present invention as defined by the following claims.

What is claimed is:
1. A battery pack assembly comprising:
an inner pack accommodating a plurality of secondary cells;
an outer pack accommodating the inner pack;
a first shock absorbing member between a first surface of the inner pack and a first surface of the outer pack, the first shock absorbing member configured to absorb a shock between the inner pack and the outer pack; and
a second shock absorbing member between at least a side surface of the inner pack and a side surface of the outer pack among surfaces of the inner pack and the outer pack other than the first surfaces, the second shock absorbing member configured to absorb a shock between the inner pack and the outer pack, wherein the inner pack comprises an inlet at a bottom portion of the inner pack through which a gas flowing in the inner pack enters, and cylindrical outlet at an upper portion of the inner pack through which the gas flowing in the inner pack exits, wherein the cylindrical outlet extends along a direction of deformation of the first shock absorbing member and passes through the outer pack, and wherein the second shock absorbing member comprises an elastic and thermally insulative material.

2. The battery pack assembly of claim 1, wherein the first shock absorbing member comprises a spring.

3. The battery pack assembly of claim 1, wherein the second shock absorbing member contacts the side surface of the inner pack and the side surface of the outer pack.

4. The battery pack assembly of claim 1, wherein the inner pack and the outer pack have substantially hexahedral shapes, and wherein the second shock absorbing member comprises:

a first shock absorption unit between the side surface of the inner pack and the side surface of the outer pack; and a second shock absorption unit between a second surface of the inner pack and a second surface of the outer pack, the second surfaces of the inner and outer packs being opposite the first surfaces.

5. The battery pack assembly of claim 4, wherein the first shock absorption unit is fixed to the side surface of the outer pack.

6. The battery pack assembly of claim 1, further comprising a third shock absorbing member between a second surface of the inner pack and a second surface of the outer pack, the second surfaces of the inner and outer packs being opposite the first surfaces.

7. The battery pack assembly of claim 6, wherein the third shock absorbing member comprises a spring.

8. The battery pack assembly of claim 7, wherein the second shock absorbing member comprises:

a first shock absorption unit between the side surface of the inner pack and the side surface of the outer pack; and a second shock absorption unit between the second surface of the inner pack and the second surface of the outer pack.

9. The battery pack assembly of claim 1, further comprising a plurality of flow channels between neighboring secondary cells of the plurality of secondary cells and through which the gas for controlling temperatures of the plurality of secondary cells flows.

10. The battery pack assembly of claim 1, wherein the gas flowing in the inner pack enters and exits the inner pack to control temperatures of the plurality of secondary cells.

11. The battery pack assembly of claim 1, further comprising a cooling unit to supply a cooling gas to the inner pack.

12. The battery pack assembly of claim 1, further comprising a heating unit to supply a heating gas to the inner pack.

13. The battery pack assembly of claim 1, wherein the battery pack assembly is configured for use as a power source for propelling an electric vehicle or a hybrid electric vehicle.

* * * * *